US012756129B2

(12) United States Patent
Huang et al.

(10) Patent No.: US 12,756,129 B2
(45) Date of Patent: Oct. 6, 2026

(54) ELECTRICAL SOCKET DEVICE WITH SHUTTER

(71) Applicant: Zhejiang Shengyu Electrical Co., Ltd, Lishui (CN)

(72) Inventors: Hanyi Huang, Lishui (CN); Tuo Gao, Lishui (CN)

(73) Assignee: ZHEJIANG SHENGYU ELECTRICAL CO., LTD., Lishui (CN)

( * ) Notice: Subject to any disclaimer, the term of this patent is extended or adjusted under 35 U.S.C. 154(b) by 333 days.

(21) Appl. No.: 18/433,351

(22) Filed: Feb. 5, 2024

(65) Prior Publication Data

US 2025/0079743 A1 Mar. 6, 2025

(30) Foreign Application Priority Data

Aug. 30, 2023 (CN) ........................ 202311106021.7

(51) Int. Cl.
*H01R 13/453* (2006.01)

(52) U.S. Cl.
CPC ................................ *H01R 13/4534* (2013.01)

(58) Field of Classification Search
CPC ................................................ H01R 13/4534
USPC ......................................................... 439/137
See application file for complete search history.

(56) References Cited

U.S. PATENT DOCUMENTS

| | | | | | |
|---|---|---|---|---|---|
| 4,544,219 | A * | 10/1985 | Barkas | H01R 13/4534 | 439/137 |
| 7,312,394 | B1 * | 12/2007 | Weeks | H01R 13/4534 | 439/106 |
| 7,510,412 | B1 * | 3/2009 | Valentin | H01R 24/78 | 439/145 |
| 7,642,457 | B2 * | 1/2010 | Weeks | H01R 13/4534 | 439/106 |
| 7,645,149 | B2 * | 1/2010 | Carbone | H01R 13/4534 | 439/137 |
| 7,833,030 | B1 * | 11/2010 | Huang | H01R 13/4534 | 439/137 |
| 7,914,307 | B1 * | 3/2011 | Yang | H01R 13/4534 | 439/145 |
| 8,550,829 | B2 * | 10/2013 | Huang | H01R 13/4534 | 439/127 |
| 8,568,152 | B1 * | 10/2013 | Weeks | H01R 13/713 | 439/137 |
| 8,858,245 | B2 * | 10/2014 | Huang | H02H 3/16 | 439/145 |

* cited by examiner

*Primary Examiner* — Gary F Paumen

(57) ABSTRACT

An electrical socket device with shutter includes a cover plate and a socket assembly. The socket assembly includes at least one socket, and the cover plate includes at least one set of slots corresponding to the at least one socket. Each set of slots includes a left slot and a right slot, and each socket includes a left plug bush and a right plug bush. A shutter assembly is provided between each socket and one corresponding set of slots. The shutter assembly is arranged at an inner side of the cover plate, and includes a first shutter and a second shutter arranged along a distribution direction of the left and right slots. The first shutter is inserted into the second shutter, and a shutter spring is provided between the first shutter and the second shutter.

9 Claims, 5 Drawing Sheets

ELECTRICAL SOCKET DEVICE WITH SHUTTER

CROSS-REFERENCE TO RELATED APPLICATIONS

The present application claims priority to Chinese Patent Application No. 202311106021.7, filed on Aug. 30, 2023, the entire contents of which are hereby incorporated by reference.

TECHNICAL FIELD

The present application relates to the technical field of electrical accessories, in particular to an electrical socket device with shutter.

BACKGROUND

Household and similar electrical sockets are widely used in residential buildings, generally installed on a wall at a position close to the ground or on a floor, or placed on objects such as floors and tables, making them be easy for people to come into contact with. Especially for children or young children who may insert foreign objects such as paper clips, electric pens, hair clips, ignition pins, keys, etc. into any hole of the electrical socket, there is a risk of electric shock.

In order to prevent foreign objects from being inserted into the electrical sockets, some electrical sockets have shutters provided therein. However, due to the complex structure, high material consumption, and difficult assembly of the shutters in most electrical sockets, the manufacturing cost is relatively high.

SUMMARY

An object of the present application is to provide an electrical socket device with shutter, wherein its shutter has a simple and stable internal structure, a combination manner between the shutter and a socket body is simple and thus easy to install. The shutter not only prevents foreign objects from being inserted into the socket and thus plays a protective role, but also meets the standard requirements of the socket with shutter for connecting electrical circuits, thereby achieving the object of simple structure, easy assembly, and reduced manufacturing costs.

To achieve the above object, a technical solution of the present application is:

An electrical socket device with shutter, including a cover plate and a socket assembly, the socket assembly including at least one socket, the cover plate being provided with at least one set of slots corresponding to the at least one socket, each set of slots including a left slot and a right slot, each socket including a left plug bush and a right plug bush, wherein a shutter assembly is provided between each socket and one corresponding set of slots, the shutter assembly being arranged at an inner side of the cover plate, and including a first shutter and a second shutter arranged along a distribution direction of the left and right slots, the first shutter being inserted into the second shutter, and a shutter spring being provided between the first shutter and the second shutter;

when there are no pins inserted into the left and right slots, the first shutter and the second shutter form a dual protection to the left and right plug bushes under the action of the shutter spring;

when both the left and right slots have pins inserted therein, the first shutter and the second shutter move rightward and leftward, respectively, under the push of the pins, releasing the dual protection to the left and right plug bushes; and when a foreign object is inserted into one of the left and right slots, one of the first shutter and the second shutter corresponding to the one of the left or right slots in which the foreign object foreign object is inserted moves, maintaining one of the dual protection to the left and right plug bushes.

In some embodiments, the first shutter includes a first splitter plate, a left end face of the first splitter plate acts as a left limit end face, a left inclined block is set above a left side of the first splitter plate, a left end face of the left inclined block is an inclined face, a right end face of the left inclined block is provided with a left spring seat, and a first window is provided on the first splitter plate; the second shutter includes a second splitter plate, a right inclined block is provided on the second splitter plate, a right end face of the right inclined block is an inclined face, a left end face of the right inclined block is provided with a right spring seat, two lateral sides of the second splitter plate along a width direction thereof are provided with inner guide plates for facilitating an insertion of the first shutter, a second window and an auxiliary window are provided on and arranged along a length direction of the second splitter plate, a groove is provided between the right inclined block and the second splitter plate for facilitating extension of a right end of the first splitter plate therethrough, and the second shutter is provided with a right limit end face;

when both the left and right slots have pins inserted therein, the first window and the auxiliary window serve as a channel for inserting of the pin into the right plug bush, and the second window serves as a channel for inserting of the pin into the left plug bush.

In some embodiments, the first splitter plate is provided with a first self-locking protrusion, and the right inclined block is provided with a second self-locking protrusion.

In some embodiments, the inclined face of the left inclined block and the inclined face of the right inclined block are inclined towards each other.

In some embodiments, a left baffle plate, a right baffle plate, a front guide plate, a rear guide plate and an upper baffle plate are provided at an inner side of the cover plate corresponding to each socket assembly;

during installation, the left limit end face of the shutter assembly is positioned by the left baffle plate, and the right limit end face of the shutter assembly is positioned by the right baffle plate.

In some embodiments, a support frame is provided above the socket to support the shutter assembly, and windows corresponding to left and right plug bushes are provided on the support frame.

Compared with the prior art, the electrical socket device with shutter of the present application has the following beneficial effects:

1) The shutter assembly of the present application consists only of two shutters and one spring. Among them, the two shutters each are injection parts formed by one-time molding process, which have a simple structure, fewer materials, and low manufacturing costs;

2) The shutter assembly of the present application relies on its own spring force and self-locking protrusions. After assembly, an internal structure of the shutter assembly is stable, easy to assemble, and the production cost is low;

3) The shutter assembly of the present application provides a double separating structure for the plug bushes in the socket, which not only can prevent foreign objects from being inserted into the socket and thus provide protection, but also meets the basic structural requirements of electrical socket with shutter.

IN THE DRAWINGS

1, cover plate; 13, left baffle plate; 15, right baffle plate; 18, upper baffle plate; 111, left slot; 112, right slot; 19, front guide plate; 20, rear guide plate;

2, socket assembly; 211, left plug bush; 212, right plug bush; 23, support frame;

3, shutter assembly; 31, first shutter; 310, left inclined block; 314, first splitter plate; 319, left limit end face; 311, left spring seat; 315, first window; 316, first self-locking protrusion; 32, second shutter; 320, right inclined block; 321, right spring seat; 323, second window; 324, second splitter plate; 325, auxiliary window; 326, second self-locking protrusion; 328, groove; 329, right limit end face; 33, shutter spring;

51, left pin; 52, right pin; 7, first foreign object; 8, second foreign object; 11, first socket; 12, second socket.

DESCRIPTION OF THE EMBODIMENTS

In order to make the objects, technical solutions and advantages of the embodiments of the present application clearer, the technical solutions according to the embodiments of the present application will be clearly and completely described with reference to drawings in the embodiments of the present application. Apparently, the embodiments described are merely some embodiments, but not all of the embodiments of the present application. All other embodiments obtained by ordinary persons skilled in the art according to the embodiments of the present application without creative efforts shall fall within the protection scope of the present application.

It should be noted that when a component is referred to as "connected" to another component, it can be connected to the another component directly or there may be a middle component connected therebetween. Unless otherwise defined, all technical and scientific terms used in this application have the same meanings as those commonly understood by those skilled in the art. The terms used in the specification of this application are only for the purpose of describing specific embodiments and are not intended to limit this application.

Embodiment 1

Figure 1:
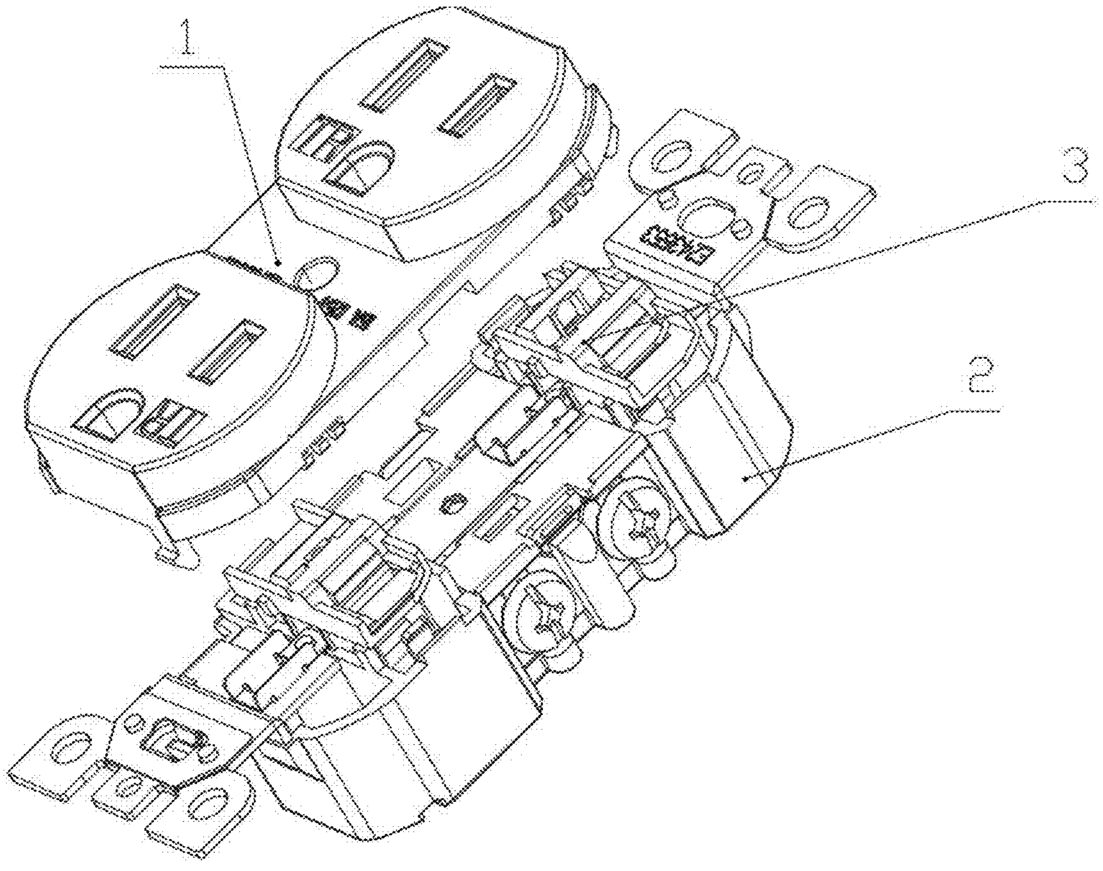
FIG. 1 is a schematic view of an electrical socket device with shutter according to an embodiment of the present application.
Figure 2:
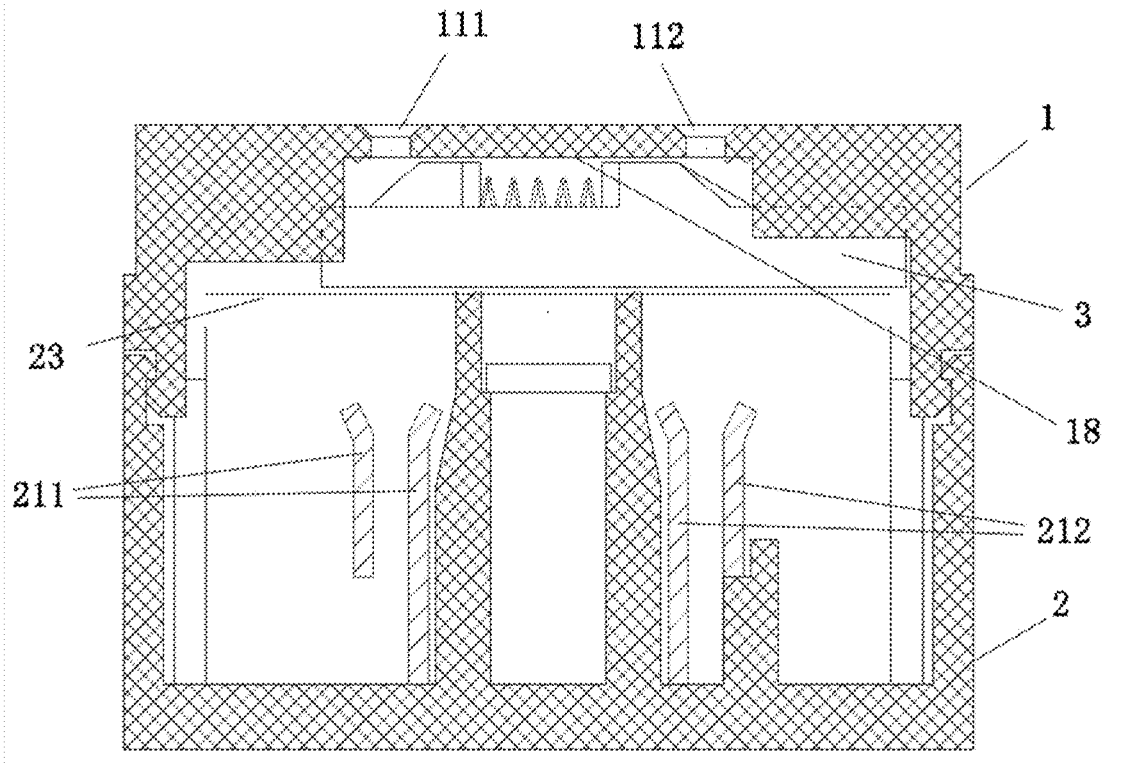
FIG. 2 is a cross sectional view of the electrical socket device with shutter of the present application.
Figure 3:
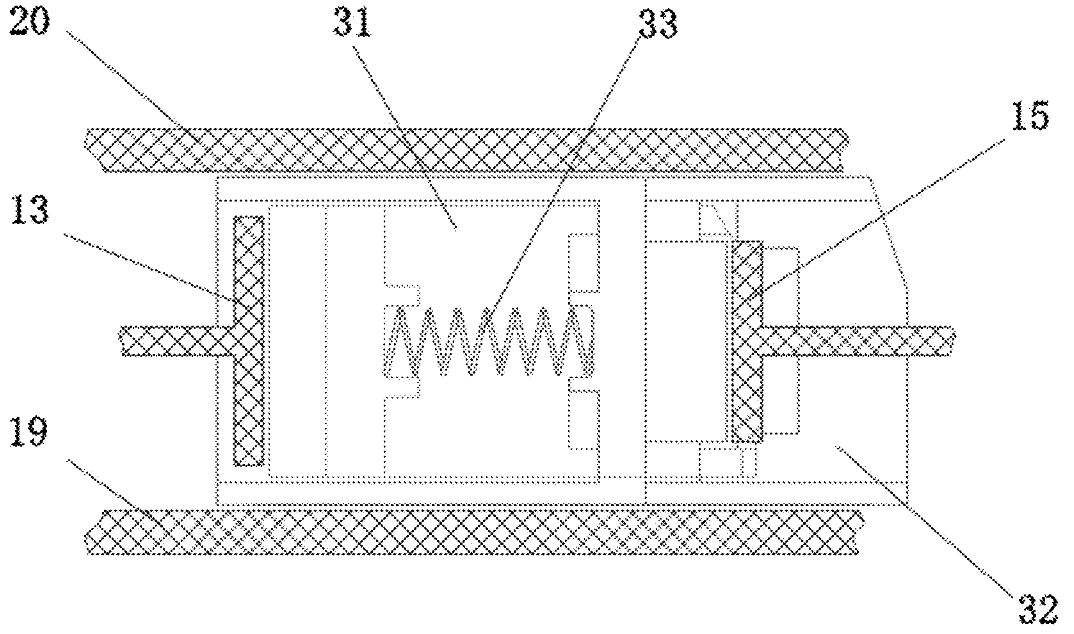
FIG. 3 is a schematic view of assembly of a shutter assembly and a cover plate of the present application.

In this embodiment, as shown in FIG. 1, FIG. 2, and FIG. 3, an electrical socket device with shutter is provided, which includes a cover plate 1 and a socket assembly 2. The socket assembly 2 includes at least one socket, and the cover plate 1 is provided with slots corresponding to each socket. The slots include a left slot 111 and a right slot 112, and the socket includes a left plug bush 211 and a right plug bush 212. The electrical socket device with shutter further includes a shutter assembly 3 set between each socket and its corresponding slots.

In this embodiment, a device with two sockets installed thereon is taken as an example, wherein the two sockets are arranged in front and back. Each socket may be three-holes socket or two-holes socket. In this embodiment, the shutter assembly is used to protect two holes of AC circuits in the socket, preventing foreign objects from being inserted into the holes and thus causing electric shock. The two holes are arranged left and right as an example for description. In this application, the number of the sockets on the device is not limited, and the specific arrangement of the sockets is also not limited, which will not be repeated below.

As shown in FIG. 2, each set of slots at least includes the left slot 111 and the right slot 112, and each socket at least includes the left plug bush 211 and the right plug bush 212. For the three-holes socket, it further includes a plug bush and a corresponding slot for the ground wire, which will not be repeated below.

The shutter assembly 3 is mounted at an inner side of the cover plate 1, and includes a first shutter 31 and a second shutter 32 arranged along a distribution direction of the left slot and the right slot. The first shutter 31 is inserted into the second shutter 32, and a shutter spring 33 is set between the first shutter 31 and the second shutter 32, as shown in FIG. 3.

Generally, during use of the socket, pins of a plug are inserted into the slots and enter the plug bushes to achieve the effect of electrical connection.

When both the left and right slots have pins inserted therein, under the push of the pins, the first shutter 31 and the second shutter 32 move rightward and leftward respectively, releasing the protection to the left and right plug bushes;

When there are no pins inserted into both the left and right slots, the first shutter 31 and the second shutter 32 form a dual protection to the left and right plug bushes under the action of the shutter spring 33;

When a foreign object is inserted into any one of the left and right slots, only one shutter corresponding to the slot with the foreign object moves, maintaining one of the dual protection to the left and right plug bushes.

Embodiment 2

The first shutter 31 includes a first splitter plate 314, and a left end face of the first splitter plate 314 acts as a left limit end face 319. A left inclined block 310 is set above the left side of the first splitter plate 314, and a left end face of the left inclined block 310 is an inclined face. A right end face of the left inclined block 310 is provided with a left spring seat 311, and a first window 315 is defined in the first splitter plate 314.

The second shutter 32 includes a second splitter plate 324, on which a right inclined block 320 is provided. A right end face of the right inclined block 320 is an inclined face, and a left end face of the right inclined block 320 is provided with a right spring seat 321. Two lateral sides of the second splitter plate 324 along a width direction thereof are provided with inner guide plates 322 for facilitating the insertion of the first shutter 31. A second window 323 and an auxiliary window 325 are defined in the second splitter plate 324 and arranged along a length direction of the second splitter plate 324. A groove 328 is provided between the right inclined block 320 and the second splitter plate 324 for extending of the first splitter plate 314 therethrough. The second shutter 32 is provided with a right limit end face 329.

When both the left and right slots have pins inserted therein, the first window 315 and the auxiliary window 325 serve as a channel for inserting of the pin into the right plug bush; and the second window 323 serves as a channel for inserting of the pin into the left plug bush.

Figure 4:
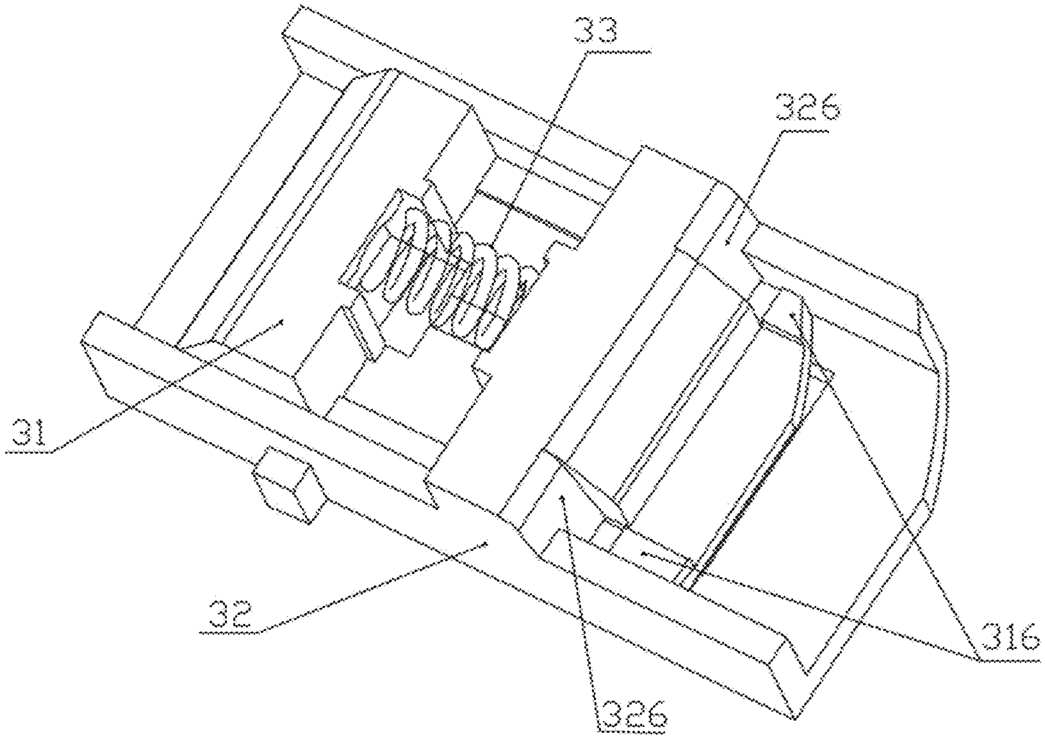
FIG. 4 is a schematic, assembled view of the shutter assembly of the present application.
Figure 5:
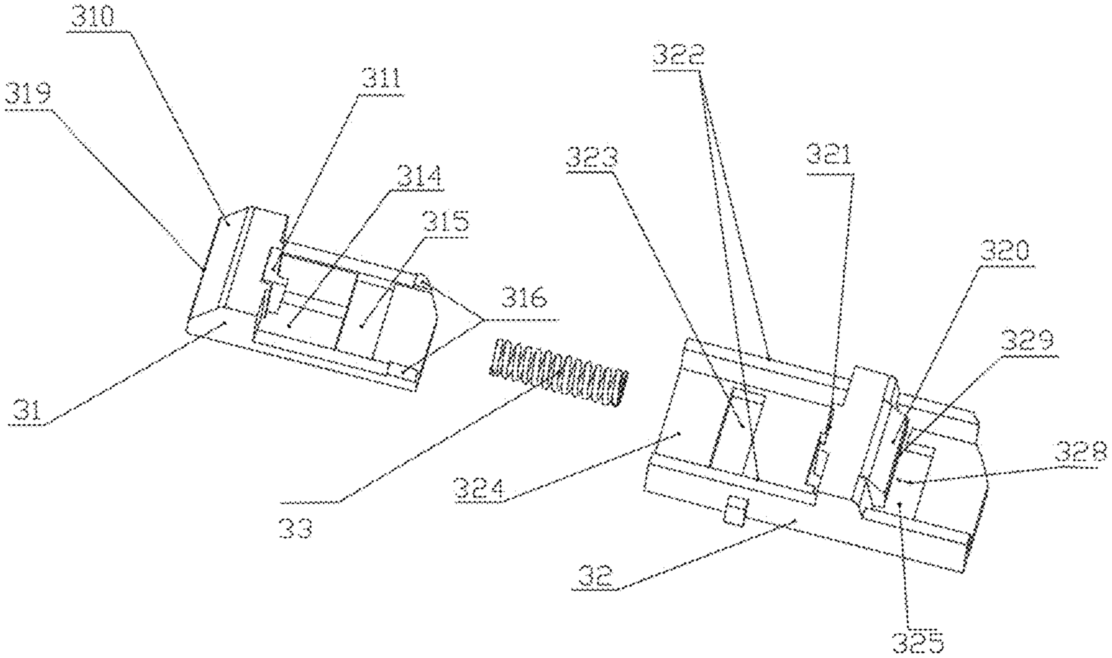
FIG. 5 is a schematic, exploded view of the shutter assembly of the present application.

Specifically, as shown in FIG. 4 and FIG. 5, the first shutter 31 includes the first splitter plate 314, and the left end face of the first splitter plate 314 acts as the left limit end face 319. When the first shutter 31 moves leftward, it stops moving due to the obstruction of a left baffle plate 13.

The left inclined block 310 is provided above the left side of the first splitter plate 314. The left end surface of the left inclined block 310 is an inclined face, and the right end surface of the left inclined block 310 is provided with the left spring seat 311. In this embodiment, the left inclined block 310 is trapezoidal-shaped, a mating surface thereof for the first splitter plate 314 is relatively wider and a top surface thereof is relatively narrower. The inclined face of the left inclined block 310 tilts from bottom left to top right, so as to push the first shutter 31 to move rightward when the pin is inserted and thus the inclined surface is squeezed.

It should be noted that the left inclined block 310 may be other shapes, such as triangle-shaped or other heterogeneous shapes, as long as the left inclined block 310 can drive the first shutter 31 to move rightward when the pin is inserted and the inclined surface is squeezed. The left limit end face 319 may be set at other positions of the first shutter 31, such as on the left inclined block 310, as long as the first shutter 31 is able to stop moving leftward due to the obstruction of the left baffle plate 13 to the left limit end face 319, and does not influence the left and right movement of the second shutter 32. Further, a position of the left inclined block 310 on the first splitter plate 314 may be set slightly to the right. Setting the left inclined block 310 on the leftmost side is preferred, it can reduce the length of the first shutter 31, which will not be repeated here.

The second shutter 32 includes the second splitter plate 324, on which the right inclined block 320 is provided. The right end face of the right inclined block 320 is an inclined face, and the left end face of the right inclined block 320 is provided with the right spring seat 321. Two sides of the second splitter plate 324 along the width direction thereof are provided with inner guide plates 322 for facilitating the insertion of the first shutter 31. The inner guide plates 322 are used to guide and limit the movement of the first shutter 31 when it is inserted. The groove 328 is provided between the right inclined block 320 and the second splitter plate 324 for facilitating extending of a right end of the first partition 314 therethrough. When the first shutter 31 is inserted into the second shutter 32, the right end of the first partition 314 extends through the groove 328.

In this embodiment, the right inclined block 320 is trapezoidal-shaped, a mating surface thereof for the second splitter plate 324 is relatively wider and a top surface thereof is relatively narrower. The inclined face of the right inclined block 320 tilts from bottom right to top left, so as to push the second shutter 32 to move leftward when the pin is inserted and thus the inclined surface is squeezed.

The second shutter 32 is provided with the right limit end face 329. In this embodiment, the right limit end face 329 is set on the lower right end face of the right inclined block 320. The second shutter 32 no longer moves rightward due to its right limit end face 329 being blocked by a right baffle plate 15.

It should be noted that the right inclined block 320 may be other shapes, such as triangle-shaped or other heterogeneous shapes, as long as the right inclined block 320 can drive the second shutter 32 to move leftward when the pin is inserted and the inclined surface is squeezed. The position of the right inclined block 320 on the second splitter plate 324 is on the right side, wherein a specific position of the right inclined block 320 can be set according to the following conditions: it can protect the plug bush when the pin is not inserted and can facilitate the insertion of the pin into the plug bush when the pin is inserted. The right limit end face 329 may be set at other positions of the second shutter 32, such as on the right end face of the second splitter plate 324 or on an outer face of the inner guide plate 322, as long as the second shutter 32 is able to stop moving rightward due to the obstruction of the right baffle plate 15 to the right limit end face 329, and does not influence the left and right movement of the first shutter 31, which will not be repeated here.

In this embodiment, the first partition 314 is provided with the first window 315, and the second splitter plate 324 is provided with the second window 323 and the auxiliary window 325 in its length direction. When both the left and right slots have pins inserted therein, the first window 315 and the auxiliary window 325 serve as a channel for inserting of the pin into the right plug bush; and the second window 323 serves as a channel for inserting of the pin into the left plug bush.

Setting of these windows is to reserve channels for inserting of the pins into the plug bushes when the plug is inserted. These channels are covered by the first and second shutters when there is no pins or other foreign object inserted, thereby providing protection for the plug bushes.

Embodiment 3

The first splitter plate 314 is provided with a first self-locking protrusion 316, and the right inclined block 320 is provided with a second self-locking protrusion 326.

Specifically, as shown in FIG. 4, the first splitter plate 314 is inserted into the second shutter 32 through the groove 328, the first splitter plate 314 is placed on the second splitter plate 324, and the shutter spring 33 is placed between the left spring seat 311 and the right spring seat 321. Under the limitation of the inner guide plates 322, the first shutter 31 can only move leftward and rightward. Further, under the spring force of the shutter spring 33, the first shutter 31 moves in the direction away from the second shutter 32 until the second self-locking protrusion 326 blocks the first self-locking protrusion 316 and thus stops moving, thereby preventing the first shutter 31 from disengaging from the second shutter 32, and thus the assembled shutter assembly 3 being stable in structure.

It should be noted that the first self-locking protrusion 316 can be set at different positions of the first shutter 31, and the second self-locking protrusion 326 can be set at any position of the second shutter 32 corresponding to the first self-locking protrusion 316. Further, the shape of the first self-locking protrusion 316 and the second self-locking protrusion 326 can be any applicable structural body, such as end face, convex block, latching groove or other structural body, as long as interlocking of the first shutter 31 and the second shutter 32 can be achieved, and it matches with the relative displacement relationship between the first shutter 31 and the second shutter 32. In this embodiment, the first self-locking protrusion 316 is a convex block and is provided at the right side of the first splitter plate 314, and the second self-locking protrusion 326 is a concave groove provided at the right side of the lower end face of the right inclined block 320.

Embodiment 4

Corresponding to each shutter assembly 3, an inner side of the cover plate 1 is provided with a left baffle plate 13, a right baffle plate 15, a front guide plate 19, a rear guide plate 20, and an upper baffle plate 18. During installation, the left limit end face 319 of the shutter assembly 3 is positioned by the left baffle plate 13, and the right limit end face 329 of the shutter assembly 3 is positioned by the right baffle plate 15.

Specifically, as shown in FIG. 2 and FIG. 3, the shutter assembly 3 is placed inside the cover plate 1. The left baffle plate 13, right baffle plate 15, upper baffle plate 18, support frame 23, front guide plate 19, and rear guide plate 20 limit the movement of the shutter assembly 3, and thus the shutter assembly 3 can only move leftward and rightward.

During installation, the left limit end face 319 of the shutter assembly 3 is in contact with the left baffle plate 13 for a limit position, the right limit end face 329 of the shutter assembly 3 is in contact with the right baffle plate 15 for a limit position. The left baffle plate 13 and the right baffle plate 15 limit the left and right movement of the shutter assembly 3, making the shutter assembly 3 only move within an area in the left and right direction. The upper baffle plate 18 and the support frame 23 are used to prevent the shutter 3 from moving upward and downward; and the front guide plate 19 and the rear guide plate 20 are used to prevent the shutter assembly 3 from moving forward or backward.

Embodiment 5

A support frame 23 is provided above the socket to support the shutter assembly 3, and the support frame 23 defines windows which correspond to the left plug bush and right plug bush, respectively.

Specifically, as shown in FIG. 2, the support frame 23 is provided above the socket to support the shutter assembly 3. Windows corresponding to the left plug bush and right plug bush are defined in the support frame 23, so that the pins can enter the plug bushes through the windows.

In the electrical socket device with shutter of the present application, the left slot 111 and the right slot 112 correspond to the left plug bush 211 and the right plug bush 212, respectively. The left slot 111 is located above the left plug bush 211, and the right slot 112 is located above the right plug bush 212. When the shutter assembly 3 is not installed, the pin or foreign object can pass through the left slot 111/right slot 112 and directly contact the left plug bush 211/right plug bush 212, which meets the basic structural requirements of electrical sockets.

FIGS. 6*a*-6*d* are schematic views of actions of the shutter, showing the motion relationship of the shutter assembly 3 inside the electrical socket device. When the shutter assembly 3 is installed inside the cover plate 1, the left baffle plate 13 is located at the left side of the left limit end face 319, above the second splitter plate 324, and between the two inner guide plates 322; and the right baffle plate 15 is located at the right side of the right limit end face 329, above or at two lateral sides of the first splitter plate 314. The left baffle plate 13 blocks the movement of the first shutter 31 to the left, but does not limit the movement of the second shutter 32; and, the right baffle plate 15 blocks the movement of the second shutter 32 to the right, but does not limit the movement of the first shutter 31.

On one hand, under the action of the spring force of the shutter spring 33, the first shutter 31 moves to the left until the left limit end face 319 is blocked by the left baffle plate 13. Similarly, under the action of the spring force of the shutter spring 33, the second shutter 32 moves to the right until the right limit end face 329 is blocked by the right baffle plate 15.

On the other hand, the left baffle plate 13 is located above the second splitter plate 324 and between the two inner guide plates 322. The movement of the second splitter plate 324 and the inner guide plates 322 is not limited by the left baffle plate 13, that is, the left baffle plate 13 does not limit the movement of the second shutter 32. The right baffle plate 15 is located above or at two lateral sides of the first splitter plate 314, and the movement of the first splitter plate 314 is not limited by the right baffle plate 15, that is, the right baffle plate 15 does not limit the movement of the first shutter 31.

Figure 6A:
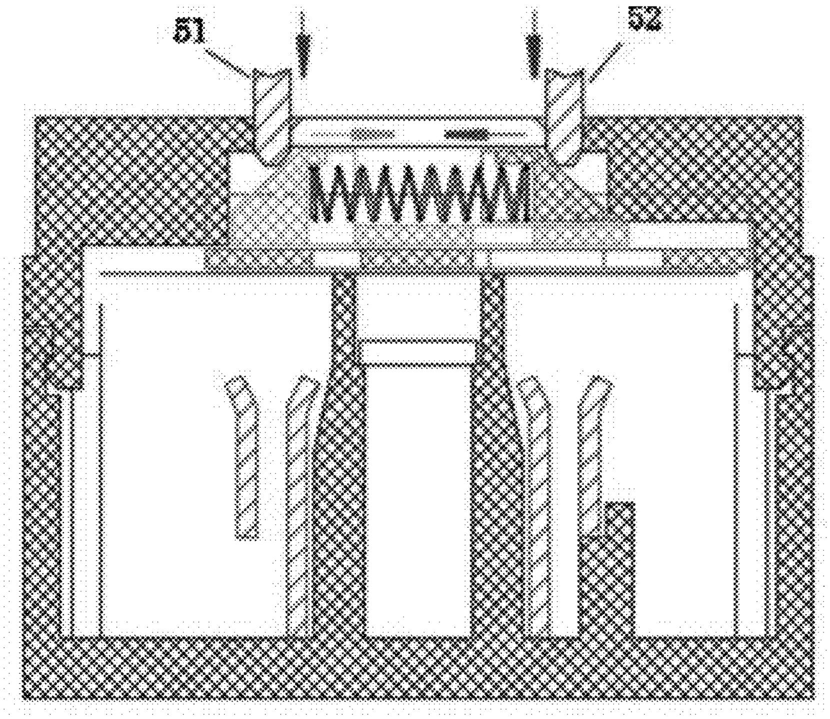
FIGS. 6*a*-6*d* are schematic views of actions of the shutters of the present application.

FIG. 6*a* shows that the shutter assembly 3 provides dual protection to the left plug bush 211 and the right plug bush 212. Specifically, the left inclined block 310 and the second splitter plate 324 are located between the left slot 111 and the left plug bush 211, and both cover the left plug bush 211; the right inclined block 320 and the first splitter plate 314 are located between the right slot 112 and the right plug bush 212, and both cover the right plug bush 212. That is, there are two protective bodies, i.e, the left inclined block 310 and the second splitter plate 324, between the left slot 111 and the left plug bush 211; and, there are also two protective bodies, i.e., the right inclined block 320 and the first splitter plate 314 between the right slot 112 and the right plug bush 212. As a result, the shutter assembly 3 provides dual protection to the left plug bush 211 and the right plug bush 212.

Figure 6B:
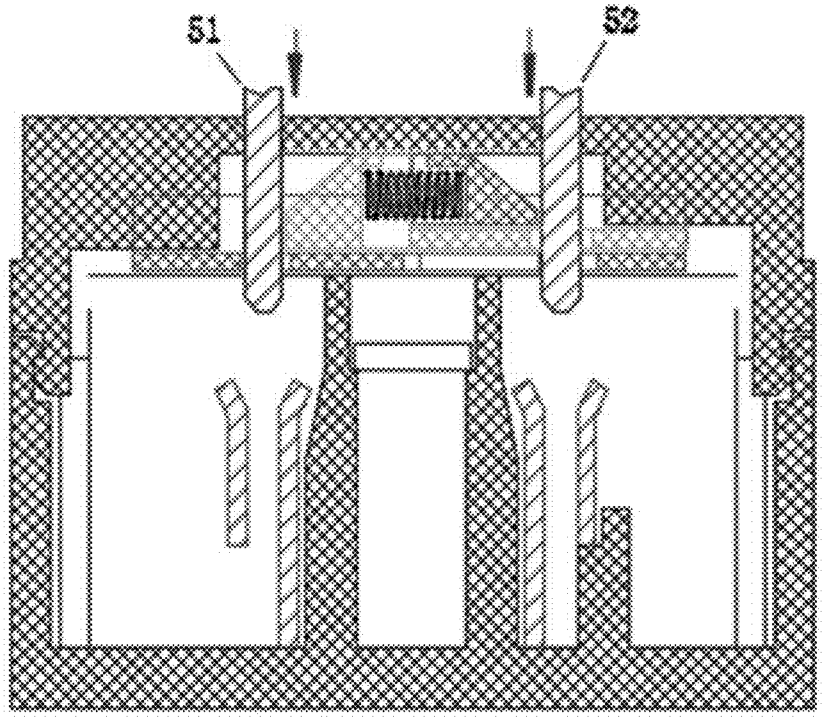

FIG. 6*b* shows positions of components when the dual protection of the shutter assembly 3 to the plug bushes is released. The first shutter 31 moves rightward along with the left inclined block 310, and the first window 315 moves rightward synchronously with it, which can simultaneously release one of the dual protection to the left plug bush 211 and the right plug bush 212. The second shutter 32 moves leftward along with the right inclined block 320, and the second window 323 and the auxiliary window 325 move leftward synchronously, which can simultaneously release the other one of the dual protection to the left plug bush 211 and the right plug bush 212. From this, it can be seen that only when the first shutter 31 moves rightward and the second shutter 32 moves leftward, the dual protection of the shutter assembly 3 to the left plug bush 211 and the right plug bush 212 can be simultaneously released.

Moving of the first shutter 31 to the left results in that: the left inclined block 310, the left limit end face 319, and the first window 315 synchronously move to the left until the left inclined block 310 moves out of a covering area between the left slot 111 and the left plug bush 211, one obstruction body of the shutter assembly 3 to the left plug bush 211 is thus removed. At the same time, the first window 315 is also synchronously moved to a position between the right window 112 and the right plug bush 212, one obstruction body of the shutter assembly 3 to the right plug bush 212 is thus removed.

Moving of the second shutter 32 to the right results in that: the right inclined block 320, the right limit end face 329, the second window 323, and the auxiliary window 325 move synchronously to the left until the right inclined block 320 moves out of a covering area between the right slot 112 and the right plug bush 212, and the auxiliary window 325 is moved to a position between the right slot 112 and the right plug bush 212. That is, the other obstruction body of the shutter assembly 3 on the right plug bush 212 is removed. At the same time, the second window 323 is also moved synchronously to a position between the left window 111 and the left plug bush 211, and thus the other obstruction body of the shutter assembly 3 on the left plug bush 211 is removed.

Figure 6C:
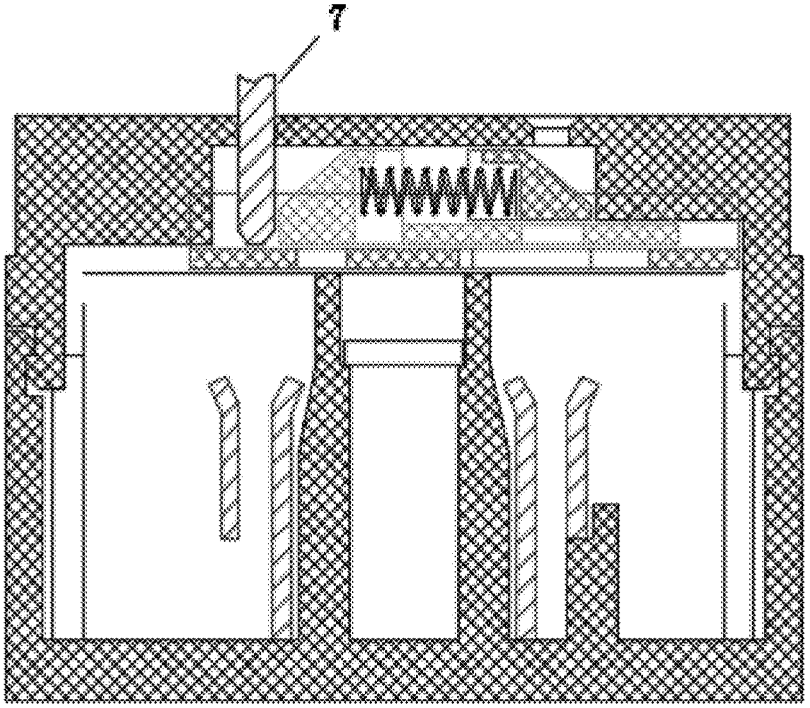

As shown in FIG. 6*c*, when a first foreign object 7 passes through the left slot 111 and pushes the left inclined block 310 to move to the right, because the second shutter 32 maintains at a position shown in FIG. 6*a*, the second splitter plate 324 covers the channel of the first foreign object 7 entering the left plug bush 211. The first foreign object 7 stops to move downwards due to being blocked by the second splitter plate 324, effectively preventing the first foreign object 7 from contacting the left plug bush 211.

Figure 6D:
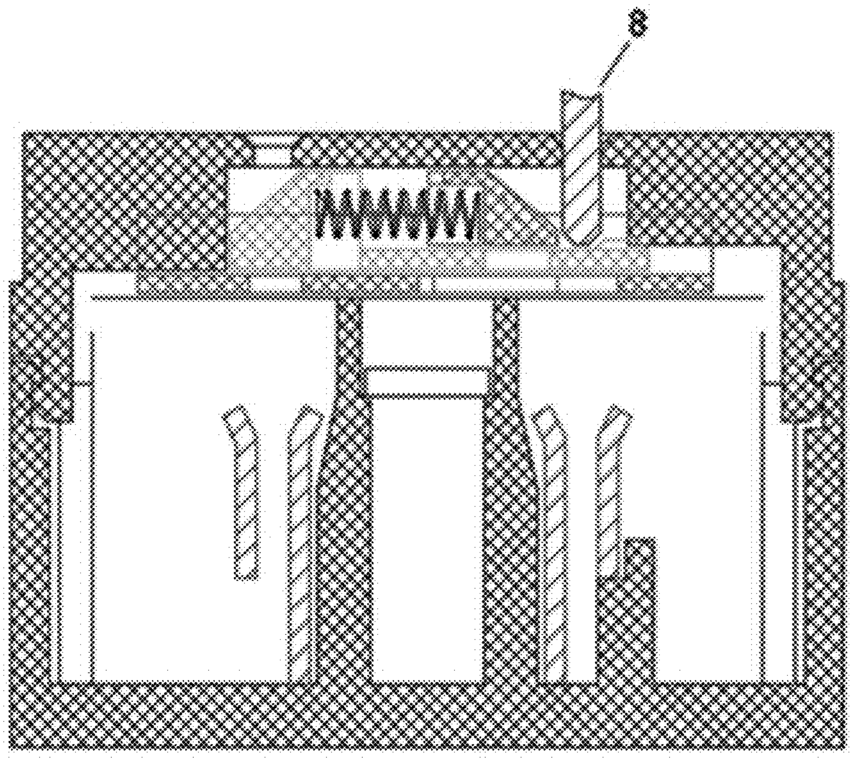

As shown in FIG. 6*d*, when a second foreign object 8 passes through the right slot 112 and pushes the right inclined block 320 to move to the left, because the first shutter 31 maintains at a position shown in FIG. 6*a*, the first splitter plate 314 covers the channel of the second foreign object 8 entering the right plug bush 212. The second foreign object 8 stops to move downwards due to being blocked by the first splitter plate 314, effectively preventing the second foreign object 8 from contacting the right plug bush 212.

As shown in FIG. 6*a* and FIG. 6*b*, which show positional relationship of the components when two pins (51 and 52) are inserted into the slots and the shutters are open. As the inclined faces of the left inclined block 310 and right inclined block tilt in opposite directions, when the two pins 51, 52 of the electrical plug respectively pass through the left slot 111 and the right slot 112, the left pin 51 pushes the left inclined block 310 to move to the right, and the right pin 52 pushes the right inclined block 320 to move to the left until the dual protection of the shutter assembly 3 to the left plug bush 211 and the right plug bush 212 is released.

During normal use, when the two pins continue to move downwards, the left pin 51 passes through the second window 323 and the support frame 23 in sequence, and then comes into contact with the left plug bush 211; the right plug 52 passes through the first window 315, the auxiliary window 325 and the support frame 23 in sequence, and then comes into contact the right plug bush 212, so as to achieve electrical connection. When the two pins of the electrical plug are pulled out from the left and right slots, under the action of the spring force of the shutter spring 33, the first shutter 31 returns to the left side and the second shutter 32 returns to the right side, that is, the shutter assembly 3 automatically returns to the state of providing dual protection to the left plug bush 211 and the right plug bush 212.

It should be noted that this device includes at least one socket, which can be installed or moved in any direction, and its position change will not change the relative position relationship between components of the electrical socket and its shutters. Due to the habit of 3D views, the positional relationships of the components and parts are described based on an electrical socket placed horizontally with two slots thereof being arranged left and right, which leads to the relative relationships of up and down, left and right, and front and back in this specification. Such descriptions of up and down, left and right, and front and back do not affect the protection scope of the claims of this application.

In the specification, the term "plate" or "frame" in the left baffle plate, the right baffle plate, the upper baffle plate, the support frame, the front guide plate and the rear guide plate can all be consisted of one or more strips, blocks, plates and their combinations, which can be set at different parts of the cover plate or the socket assembly to achieve the function of blocking or position limiting to the relevant components of the shutter in spatial orientation. The term "block", "plate", "face" in the left inclined block, the first splitter plate, the left limit end face, the right inclined block, the second splitter plate, the right limit end face and the inner guide plate can all be consisted of one or more bars, blocks, plates, faces, and their combinations, which can be set at different positions of related components, and their structures correspond one-to-one with the structures of related components and parts of the cover plate and socket assembly in spatial orientation, so as to achieve the limitation of relative positions between the components. For structures not labeled in accompanying drawings, they have no effect on the technical solution of this application and will not be described here.

Technical features of the above embodiments may be combined in any way. To make the description concise, all possible combinations of the technical features in the above embodiments have not been described. However, as long as there is no contradiction in the combination of these technical features, they should be considered within the scope of this disclosure.

The above only describe some embodiments of the present application in details, which should not be understood as a limitation to the scope of the patent disclosure. It should be pointed out that for any one of those ordinary skilled in the art, within the scope of the disclosed technology, technical solutions that are equivalently replaced or modified according to the technical solutions and inventive concepts of the present application should fall within the scope of the present application. Therefore, a protection scope of this patent application should be based on the attached claims.

What is claimed is:

1. An electrical socket device with shutter, comprising a cover plate and a socket assembly, the socket assembly comprising at least one socket, the cover plate being provided with at least one set of slots corresponding to the at least one socket, each set of slots comprising a left slot and a right slot, each socket comprising a left plug bush and a right plug bush, wherein a shutter assembly is provided between each socket and one corresponding set of slots, the shutter assembly being arranged at an inner side of the cover plate, and comprising a first shutter and a second shutter arranged along a distribution direction of the left and right slots, the first shutter being inserted into the second shutter;

the first shutter comprises a first splitter plate defining a first window therein, and a left block set on the first splitter plate, a right side face of the left block is provided with a first spring seat, a left side face of the left block comprises a left inclined face and a left limit face extending downwards from a bottom edge of the left inclined face;

the second shutter comprises a second splitter plate defining a second window and an auxiliary window therein, and a right block set on the second splitter plate, a left side face of the right block is provided with a second spring seat, a right side face of the right block comprises a right inclined face and a right limit face extending downwards from a bottom edge of the right inclined face;

a shutter spring is provided between the first spring seat of the left block and the second spring seat of the right block;

a left baffle plate is provided at a left side of the left block to prevent the first shutter from moving leftwards, and a right baffle plate is provided at is provided at a left right of the right block to prevent the second shutter from moving rightwards;

when there are no pins inserted into the left and right slots, the left baffle plate abuts the left limit face of the left block and the right baffle plate abuts the right limit face of the right block, the first shutter and the second shutter form a dual protection to the left and right plug bushes under the action of the shutter spring;

when both the left and right slots have pins inserted therein, the first shutter and the second shutter move rightward and leftward, respectively, under the push of the pins, releasing the dual protection to the left and right plug bushes, the left baffle plate moves rightwards away from the left limit face and the right baffle plate moves leftwards away from the right limit face to compress the shutter spring; and when a foreign object is inserted into one of the left and right slots, one of the first shutter and the second shutter corresponding to the one of the left or right slots in which the foreign object foreign object is inserted moves, maintaining one of the dual protection to the left and right plug bushes.

2. The electrical socket device with shutter according to claim 1, wherein two lateral sides of the second splitter plate along a width direction thereof are provided with inner guide plates for facilitating an insertion of the first shutter into the second shutter, and a groove is provided between the right block and the second splitter plate for facilitating extension of a right end of the first splitter plate therethrough;

when both the left and right slots have pins inserted therein, the first window and the auxiliary window are aligned with each other and serve as a channel for inserting of the pin into the right plug bush, and the second window serves as a channel for inserting of the pin into the left plug bush.

3. The electrical socket device with shutter according to claim 1, wherein the first splitter plate is provided with a first self-locking protrusion, and the right block is provided with a second self-locking protrusion.

4. The electrical socket device with shutter according to claim 2, wherein the left inclined face of the left block and the right inclined face of the right block are inclined towards each other.

5. The electrical socket device with shutter according to claim 2, wherein a support frame is provided above the socket to support the shutter assembly, and windows corresponding to left and right plug bushes are provided on the support frame.

6. The electrical socket device with shutter according to claim 1, wherein the left limit face of the left block and the right limit face of the right block are parallel to each other.

7. The electrical socket device with shutter according to claim 6, wherein the left limit face of the left block is perpendicular to the first splitter plate, and the right limit face of the right block is perpendicular to the right splitter plate.

8. The electrical socket device with shutter according to claim 6, wherein a bottom edge of the right limit face of the right block is above the right splitter plate, and the first splitter plate is located between the right limit face and the right splitter plate.

9. The electrical socket device with shutter according to claim 1, wherein the left inclined face of the left block and the right inclined face of the right block are flat faces.

* * * * *